(12) United States Patent  
Kobayashi et al.

(10) Patent No.: US 7,931,409 B2
(45) Date of Patent: Apr. 26, 2011

(54) WHEEL BEARING APPARATUS

(75) Inventors: Keizo Kobayashi, Iwata (JP); Hiroto Suma, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/580,485

(22) Filed: Oct. 16, 2009

(65) Prior Publication Data

US 2010/0040319 A1    Feb. 18, 2010

Related U.S. Application Data

(63) Continuation of application No. PCT/JP2008/000993, filed on Apr. 16, 2008.

(30) Foreign Application Priority Data

Apr. 16, 2007    (JP) ................................ 2007-106967

(51) Int. Cl.
*F16C 19/18*    (2006.01)
(52) U.S. Cl. ..................................... 384/544; 301/105.1
(58) Field of Classification Search .................. 384/544, 384/589, 537; 301/105.1, 125
See application file for complete search history.

(56) References Cited

U.S. PATENT DOCUMENTS

| | | | | |
|---|---|---|---|---|
| 2,206,323 | A | * | 7/1940 | Hughes ......................... 384/544 |
| 4,990,000 | A | * | 2/1991 | Harsdorff ....................... 384/544 |
| 5,927,820 | A | * | 7/1999 | Vignotto et al. ........... 301/105.1 |
| 6,170,919 | B1 | * | 1/2001 | Hofmann et al. .......... 301/105.1 |
| 2003/0017025 | A1 | | 1/2003 | Wojciechowski et al. |
| 2007/0201783 | A1 | * | 8/2007 | Hirai et al. ..................... 384/544 |
| 2009/0046970 | A1 | * | 2/2009 | Kawamura et al. ........... 384/544 |

FOREIGN PATENT DOCUMENTS

| | | |
|---|---|---|
| EP | 1 417 419 | 8/2006 |
| JP | 51-057658 | 5/1976 |
| JP | 2000-309281 | 11/2000 |
| JP | 2002-081452 | 3/2002 |
| JP | 2003-113849 | 4/2003 |
| JP | 2004-332812 | 11/2004 |
| JP | 2006-151067 | 6/2006 |
| JP | 2006-334713 | 12/2006 |
| WO | WO 03/008817 | 1/2003 |

* cited by examiner

*Primary Examiner* — Thomas R Hannon
(74) *Attorney, Agent, or Firm* — Harness, Dickey & Pierce, P.L.C.

(57) ABSTRACT

A wheel bearing apparatus for a driven wheel of a vehicle has an outer member, an inner member and rolling elements between the two. The outer member has a body mounting flange for mounting it to a knuckle of a suspension apparatus. The knuckle has a disc shaped bottom portion. The outer member is secured to the knuckle by fastening bolts. The body mounting flange abuts against the bottom portion of the knuckle. The inner side end of the inner member is closed by the knuckle. A plurality of pins is secured to the knuckle. Pin bores to receive the pins are formed on the body mounting flange. The pin bores radially positioning the outer member relative to the knuckle.

6 Claims, 4 Drawing Sheets

[Fig 1]
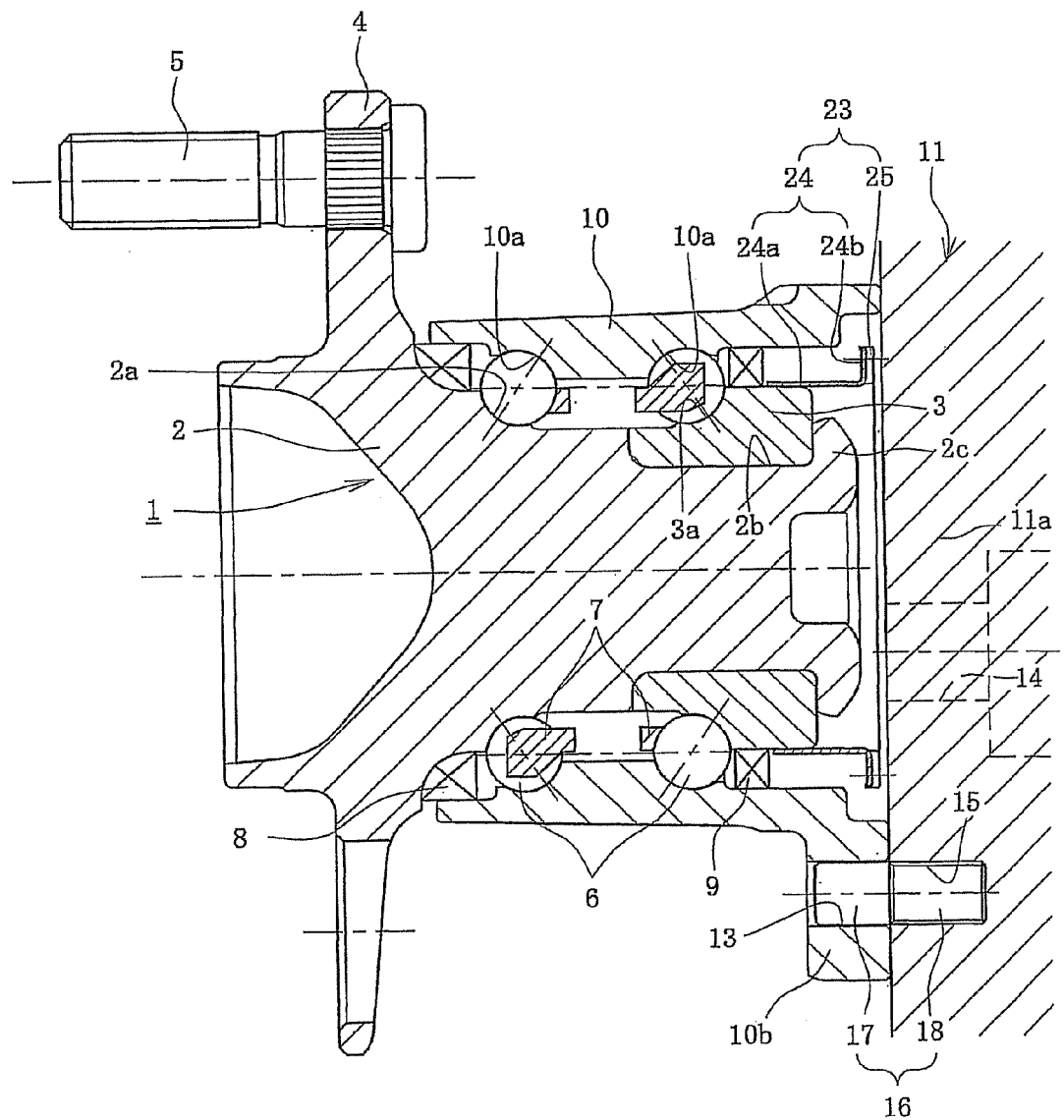

[Fig 2]
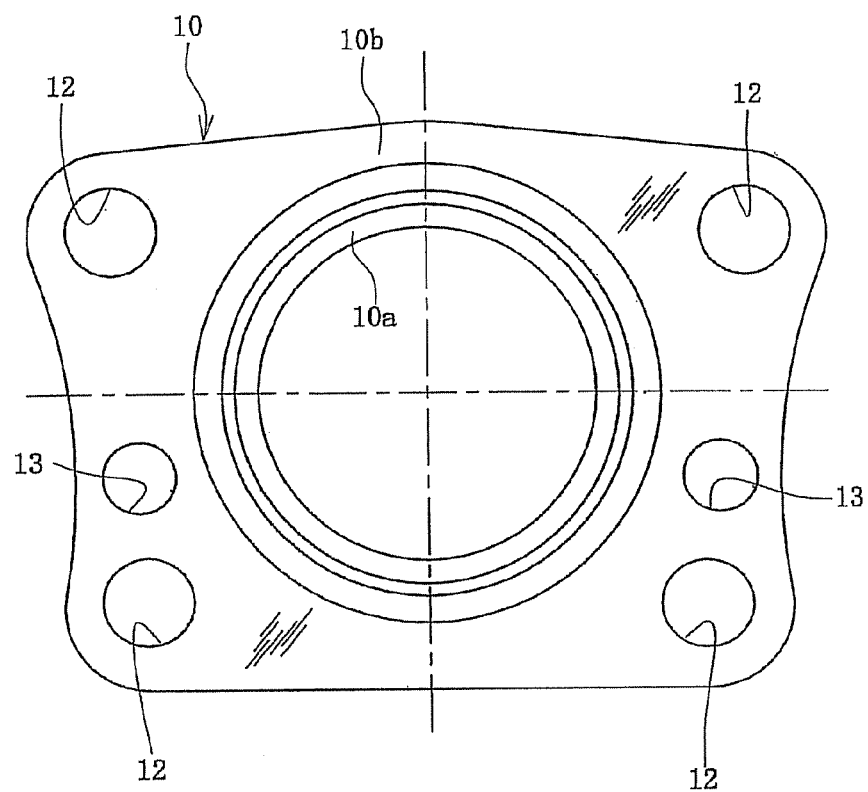

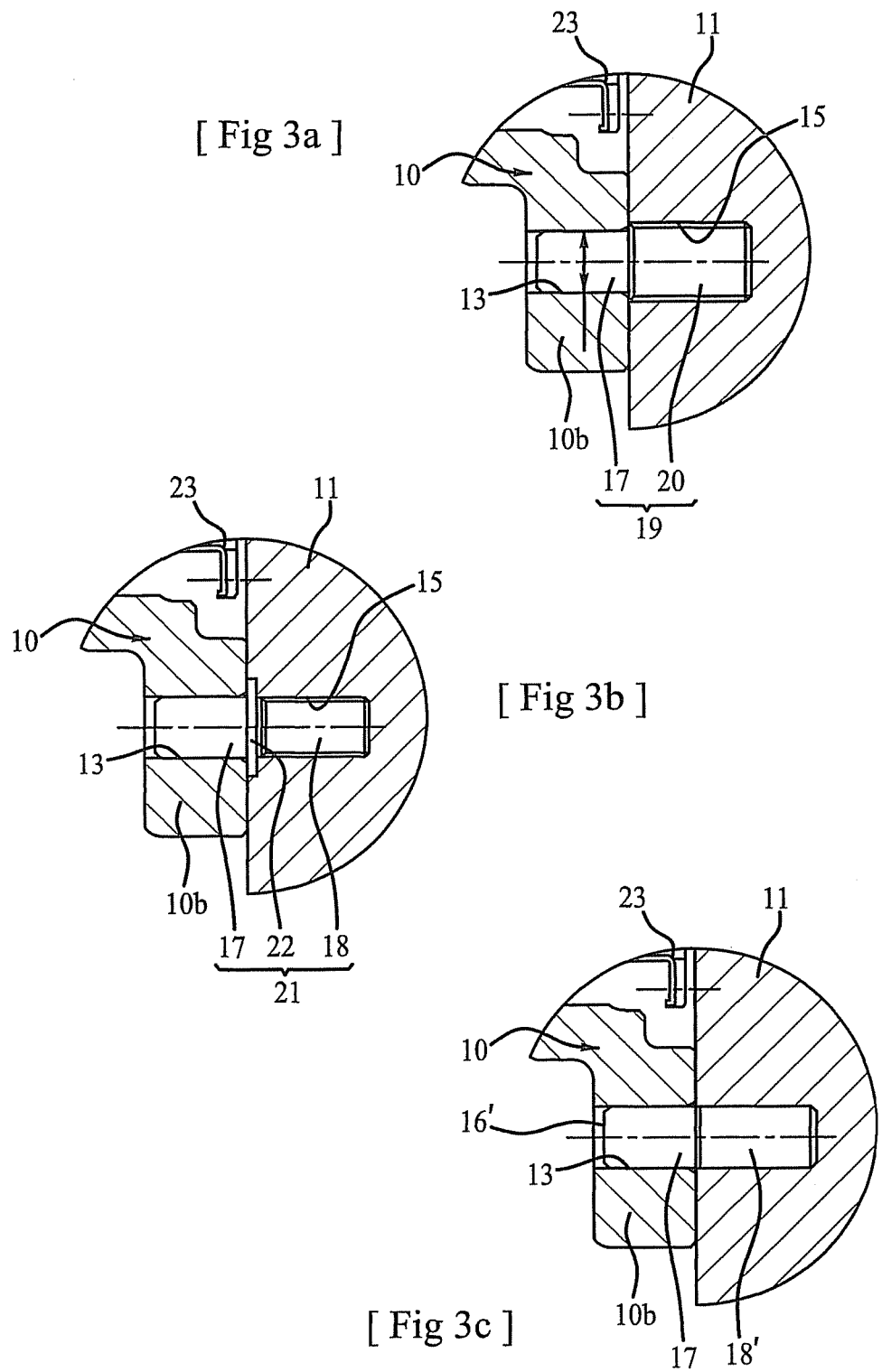

[Fig 4]
PRIOR ART
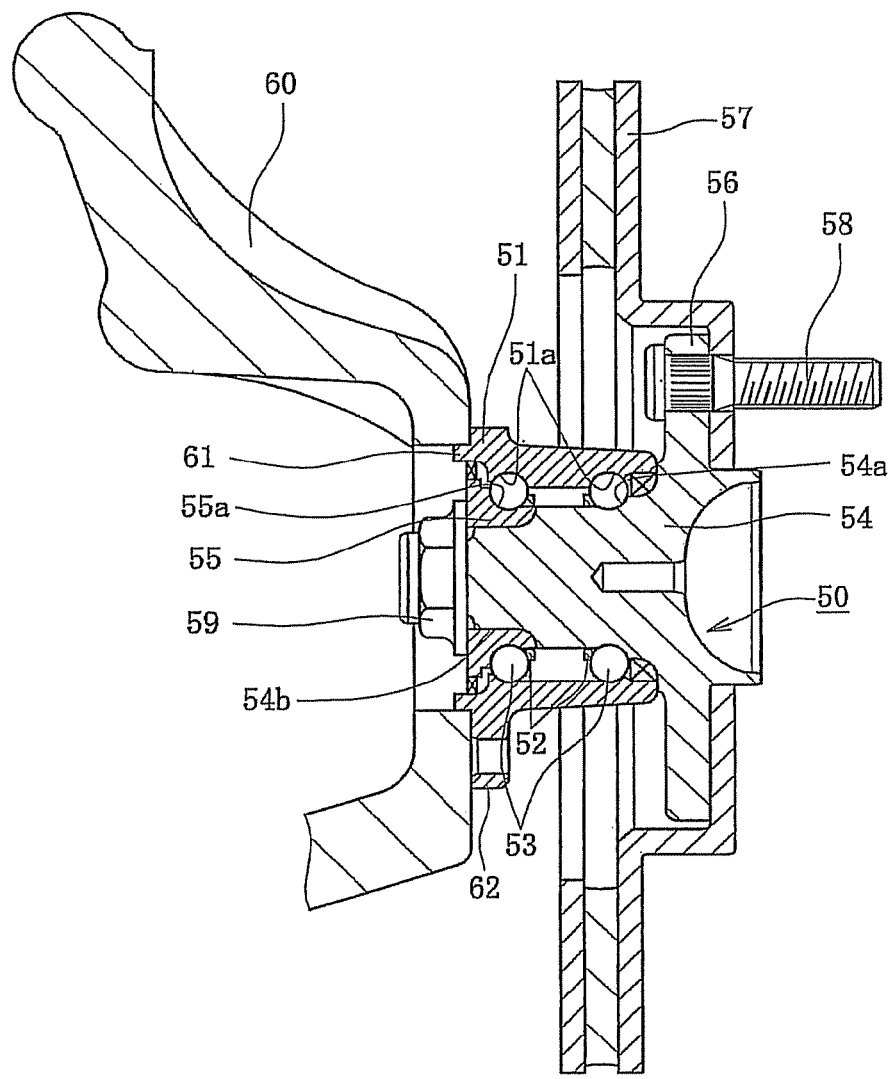

ND STATES PATENT

WHEEL BEARING APPARATUS

CROSS-REFERENCE TO RELATED APPLICATIONS

This application is a continuation of International Application No. PCT/JP2008/000993, filed Apr. 16, 2008, which claims priority to Japanese Application No. 2007-106967, filed Apr. 16, 2007. The disclosures of the above applications are incorporated herein by reference.

FIELD

The present disclosure relates to a wheel bearing apparatus that rotatably supports a wheel of a vehicle relative to a suspension apparatus and, more particularly, to a wheel bearing apparatus for a driven wheel of a vehicle that reduces its size and weight and improves the rigidity and strength of a knuckle of the vehicle.

BACKGROUND

The known wheel bearing apparatus for a driven wheel shown in FIG. 4 is a representative structural example of the prior art. This wheel bearing apparatus is referred to as a third generation type. It has an inner member 50, an outer member 51, and double row balls 53, 53 rollably contained, via cages 52, between the inner and outer members 50, 51. The inner member 50 has a wheel hub 54 and an inner ring 55 secured onto the wheel hub 54. The wheel hub 54 has, at its one end, an integrally formed wheel mounting flange 56. The flange 56 mounts a wheel of a vehicle (not shown). The wheel hub outer circumference has an inner raceway surface 54a and a cylindrical portion 54b that axially extends from the inner raceway surface. Hub bolts 58 are secured onto the wheel mounting flange 56 equidistantly along its periphery to mount a wheel and a brake rotor 57.

The inner ring 55 is formed with an inner raceway surface on its outer circumference. The inner ring is press-fit onto the cylindrical portion 54b of the wheel hub 54 via a predetermined interference. The inner ring 55 is prevented from being axially slipped off from the wheel hub 54 by a securing nut 59 fastened to the end of the cylindrical portion 54b. Alternatively, a caulked portion (not shown), formed by plastically deforming the end of the cylindrical portion 54b radially outward, prevents the ring from slipping off of the wheel hub 54.

The outer member 51 is integrally formed with a body mounting flange 62 on its outer circumference. The body mounting flange 62 is mounted on a knuckle 60 that forms part of a suspension apparatus of the vehicle. The outer member 51 inner circumference is formed with double row outer raceway surfaces 51a, 51a. Double row balls 53, 53 are rollably contained between the double row outer raceway surfaces 51a, 51a and the inner raceway surfaces 54a, 55a, arranged opposite to the double row outer raceway surfaces 51a, 51a. (Reference Patent Document: Japanese Laid-open Patent Publication No. 81452/2002).

However, in the prior art wheel bearing apparatus, since the inner circumference of the knuckle 60 is opened so that a pilot portion 61 of the outer member 51 can be inserted therein, several problems occur. One such problem is that the rigidity and strength of the knuckle 60 becomes insufficient. Additionally, foreign material such as rain water or dusts directly splash on seals or a sensor (not shown) arranged on the inner side of the bearing. To solve such a problem, it may be appreciated to eliminate the pilot portion 61 of the outer member 51 so that the inner circumference of the knuckle 60 can be closed. Thus, it is believed that centering between the outer member 51 and the knuckle 60 during their assembly would be difficult and errors would be caused during assembly.

SUMMARY

It is therefore an object of the present disclosure to provide a wheel bearing apparatus for a driven wheel of a vehicle that can reduce its size and weight and improve the rigidity and strength of the knuckle of the vehicle.

To achieve the mentioned above object, a wheel bearing apparatus for a driven wheel of a vehicle comprises an outer and inner member. The outer member is integrally formed with a body mounting flange on its outer circumference. The body mounting flange is adapted to be mounted on a knuckle. The knuckle forms part of a suspension apparatus. The outer member inner circumference has double row outer raceway surfaces. The inner member includes a wheel hub and at least one inner ring. The wheel hub is integrally formed at one end with a wheel mounting flange. The other end includes a cylindrical portion. The at least one inner ring is press-fit onto the cylindrical portion of the wheel hub. The inner member is formed with double row inner raceway surfaces on its outer circumference. The double row inner raceway surfaces are arranged opposite to the double row outer raceway surfaces. Double row rolling elements are rollably contained, via cages, between the inner raceway surfaces of the inner member and the outer raceway surfaces of the outer member. The knuckle has a disc shaped bottom portion. The outer member is secured to the knuckle by fastening bolts. The body mounting flange abuts against the bottom portion of the knuckle. The inner side end of the inner member is closed by the knuckle. A plurality of pins is secured to the knuckle. The pin bores for receiving the pins are apertured or formed on the body mounting flange to radially position the outer member relative to the knuckle.

In such a wheel bearing apparatus for a driven wheel of a vehicle wheel, the knuckle has a disc shaped bottom portion and the outer member is secured to the knuckle by fastening bolts. The body mounting flange abuts against the bottom portion of the knuckle. The inner side end of the inner member is closed by the knuckle. A plurality of pins is secured to the knuckle. Pin bores to receive the pins are apertured or formed on the body mounting flange to radially position the outer member relative to the knuckle. Thus, it is possible to reduce the size and weight of the wheel bearing apparatus and improve the rigidity and strength of the knuckle of the vehicle. Additionally, it makes easy alignment of axial centers of the outer member and the knuckle as well as the positioning of them relative to the bolt bores. Accordingly, this simplifies the assembly.

The bottom portion of the knuckle is formed with threaded bores. The pin has a tip portion to be inserted into the pin bore. The pin also has a threaded portion that is screwed into the threaded bore. This enables a sure and easy connection of the pin to the knuckle.

The tip portion of the pin is formed with a smaller diameter than that of the threaded portion. The pin is formed with a stepped configuration. This prevents the pin from slipping off of the knuckle by vibration caused during driving of the vehicle. Thus, this improves the reliability of the wheel bearing apparatus.

A flanged portion is integrally formed between the tip portion of the pin and the threaded portion. This prevents the pin from slipping off of the knuckle. Also, it surely performs the positioning of the pin itself relative to the knuckle. Further, it improves the sealability between the outer member and knuckle with the body mounting flange of the outer member that closely contacts the knuckle.

The bottom portion of the knuckle is formed with pin bores. The pins are press-fit via a predetermined interference into the pin bores. This makes it possible to simplify the pin structure and the workability during assembly.

The inner member comprises the wheel hub and inner ring. The wheel hub is formed with one inner raceway surface on its outer circumference. The one inner raceway surface opposes one of the double row outer raceway surfaces. The wheel hub cylindrical portion axially extends from the inner raceway surface. The inner ring is press-fit onto the cylindrical portion of the wheel hub, via a predetermined interference. The inner ring is formed with the other inner raceway surface on its outer circumference. The other inner raceway surface opposes the other of the double row outer raceway surfaces. The inner ring is axially secured by a caulked portion that is formed by plastically deforming the end of the cylindrical portion radially outward. The caulked portion applies a predetermined bearing pre-pressure to the inner ring. This makes it possible to reduce the size and weight of the wheel bearing apparatus and to improve its rigidity and strength.

The wheel bearing apparatus for a driven wheel of a vehicle comprises an outer and inner member. The outer member is integrally formed with a body mounting flange on its outer circumference. The body mounting flange is adapted to be mounted on a knuckle that forms part of a suspension apparatus. The outer member inner circumference includes double row outer raceway surfaces. The inner member includes a wheel hub and at least one inner ring. The wheel hub is integrally formed at one end with a wheel mounting flange. Its other end includes a cylindrical portion. The at least one inner ring is press-fit onto the cylindrical portion of the wheel hub. The inner member is formed with double row inner raceway surfaces on its outer circumference. The double row inner raceway surfaces are arranged opposite to the double row outer raceway surfaces. Double row rolling elements are rollably contained, via cages, between the inner raceway surfaces of the inner member and the outer raceway surfaces of the outer member. The knuckle has a disc shaped bottom portion. The outer member is secured to the knuckle by fastening bolts with the body mounting flange abutted against the bottom portion of the knuckle. The inner side end of the inner member is closed by the knuckle. A plurality of pins is secured to the knuckle. Pin bores, for receiving the pins, are apertured or formed on the body mounting flange to radially position the outer member relative to the knuckle. Thus, it is possible to reduce the size and weight of the wheel bearing apparatus and to improve rigidity and strength of the knuckle of the vehicle. Additionally, it makes easy alignment of axial centers of the outer member and the knuckle as well as positioning them relative to the bolt bores. Accordingly, this simplifies assembling working.

A wheel bearing apparatus for a wheel of a vehicle comprises an outer and inner member. This outer member is integrally formed with a body mounting flange on its outer circumference. The body mounting flange is adapted to be mounted on a knuckle that forms part of a suspension apparatus. The outer member inner circumference includes double row outer raceway surfaces. The inner member includes a wheel hub and inner ring. The wheel hub is integrally formed at one end with a wheel mounting flange. The wheel hub outer circumference has one inner raceway surface opposed to one of the double row outer raceway surfaces. A cylindrical portion axially extends from the inner raceway surface. The inner ring is press-fit onto the cylindrical portion of the wheel hub via a predetermined interference. The inner ring outer circumference includes the other inner raceway surface opposed to the other of the double row outer raceway surfaces. Double row rolling elements are rollably contained, via cages, between the inner raceway surfaces of the inner member and the outer raceway surfaces of the outer member. The inner ring is axially secured by a caulked portion that is formed by plastically deforming the end of the cylindrical portion radially outward. The caulked portion applies a predetermined bearing pre-pressure to the inner ring. The knuckle has a disc shaped bottom portion. The outer member is secured to the knuckle by fastening bolts. The body mounting flange abuts against the bottom portion of the knuckle. The inner side end of the inner member is closed by the knuckle. A plurality of pins is screwed into the knuckle. Pin bores to receive the pins are apertured on the body mounting flange to radially positioning the outer member relative to the knuckle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal-section view of a wheel bearing apparatus.

FIG. 2 is a front view of an outer member of FIG. 1.

FIG. 3(a) is a partially enlarged view of one modification of a pin of FIG. 1.

FIG. 3(b) is a partially enlarged view of another modification of a pin of FIG. 1.

FIG. 3(c) is a partially enlarged view of another modification of a pin of FIG. 1

FIG. 4 is a longitudinal-section view of a prior art wheel bearing apparatus.

DETAILED DESCRIPTION

Preferable embodiments of the present disclosure will be hereinafter described with reference to the drawings.

FIG. 1 is a longitudinal-section view of a preferred embodiment of a wheel bearing apparatus of the present disclosure. FIG. 2 is a front view of an outer member of FIG. 1. FIGS. 3(a), (b) and (c) are partially enlarged views showing modifications of a positioning pin. In the description below, the outer side of the bearing apparatus, when it is mounted on a vehicle, is referred to as the "outer side" (left-hand side in drawings). The inner side of a bearing apparatus, when it is mounted on the vehicle, is referred to as the "inner side" (right-hand side in drawings).

This wheel bearing apparatus for a driven wheel is a so-called third generation type. It includes an inner member 1, an outer member 10, and a plurality of rolling elements (balls) 6, 6 rollably contained between the inner and outer members 1, 10. The inner member 1 includes a wheel hub 2 and an inner ring 3 press-fit onto the wheel hub 2, via a predetermined interference.

The wheel hub 2 is integrally formed, on its outer side end, with a wheel mounting flange 4 to mount a wheel (not shown) of a vehicle. Hub bolts 5 are secured on the wheel mounting flange 4 equidistantly along its periphery. The wheel hub 2 has an outer side (one) inner raceway surface 2a on its outer circumference. A cylindrical portion 2b axially extends from the inner raceway surface 2a. The inner ring 3 is press fit onto the cylindrical portion 2b of the wheel hub 2. The inner ring 3 is formed with the inner side (other) inner raceway surface 3a on its outer circumference. In addition, the inner ring 3 is axially secured on the wheel hub 2 by a predetermined bearing pre-pressure applied by a caulked portion 2c. The caulked portion 2c is formed by plastically deforming the end of the cylindrical portion 2b radially outward. This increases the strength and rigidity of the wheel bearing apparatus and reduces its size and weight.

The wheel hub 2 is made of medium/high carbon steel (carbon steels for machine structural use of SC family of JIS) such as S53C including carbon of 0.40~0.80 wt % (% by weight). It is hardened by high frequency induction hardening to have a surface hardness of 58~64 HRC in a region including the outer side inner raceway surface 2a, a seal land portion on which a seal 8 slidably contacts, and the cylindrical portion 2b. The caulking portion 2c remains as a not-quenched portion with a surface hardness of 25 HRC or less after forging. Such a high frequency quenching pattern increases the strength of the wheel hub 2 and suppresses fretting wear at the fitting surface of the inner ring 3. Thus, this improves the durability of the inner ring 3. In addition, it is possible to improve the workability during machining of the caulking portion 2c and to prevent generation of cracks during plastic deformation of the caulking portion 2c.

The inner ring 3 and the rolling elements (balls) 6 are made of high carbon chrome steel such as SUJ 2. They are hardened by dip quenching to their core portions to have a hardness of 58~64 HRC.

The outer member 10 has an integrally formed body mounting flange 10b adapted to be mounted on a knuckle 11. The outer member inner circumference includes double row outer raceway surfaces 10a, 10a. Similarly to the wheel hub 2, the outer member 10 is made of medium/high carbon steel such as S53C including carbon of 0.40~0.80 wt %. The double row outer raceway surfaces 10a, 10a are hardened by high frequency induction hardening to have a surface hardness of 58~64 HRC. The double row rolling elements 6, 6 are contained between the inner raceway surfaces 2a, 3a and the outer raceway surfaces 10a, 10a. The rolling elements 6,6 are rollably held by cages 7, 7. Seals 8, 9 are mounted within annular openings formed between the outer and inner members 10, 1. The seals 8, 9 prevent leakage of lubricating grease contained in the bearing and the entry of rain water or dusts from the outside into the bearing.

A pulser ring 23 is mounted on the outer circumference of the inner ring 3. The pulser ring 23 includes a slinger 24. The slinger 24 includes a cylindrical portion 24a fit onto the outer circumference of the inner ring 3. A standing portion 24b extends radially outward from the cylindrical portion 24a. A magnetic encoder 25 is integrally adhered, via vulcanized adhesion, to a side surface of the standing portion 24b of the slinger 24.

The slinger 24 is made of a steel plate such as a ferritic stainless steel sheet (JIS SUS 430 etc.) or a preserved cold rolled sheet (JIS SPCC etc.). The slinger 24 is formed by pressing an annular ring with a substantially L-shaped cross-section.

The magnetic encoder 25 is formed from an elastomer such as rubber mingled with magnetic powder, such as ferrite. The encoder 25 has N and S poles alternately arranged equidistantly along its periphery. It constructs a rotary encoder to detect the wheel speed. A speed detecting sensor (not shown) is mounted on the knuckle 11 opposite to the magnetic encoder 25, via a predetermined air gap. The output of the speed detecting sensor is varied when the magnetic encoder 25 rotates together with the inner ring 3 in accordance with rotation of the wheel of the vehicle. Since the varying output frequency of the speed sensor is proportional to the rotational speed of the wheel, ABS can be properly controlled by inputting the output signals of the speed sensor to a controller (not shown).

Although it is illustrated and described herein is a wheel bearing apparatus of the third generation type where the inner raceway surface 2a is directly formed on the outer circumference of the wheel hub, the present disclosure is not limited to this structure and can be applied to a so-called second generation type, where a pair of inner rings are press-fit onto the cylindrical portion of the wheel hub. In addition, although it is illustrated and described with double row angular contact ball bearing, having balls 6, 6, the present disclosure can be applied to a double row tapered roller bearing using tapered rollers as the rolling elements 6.

According to the present disclosure, the knuckle 11 is integrally formed with a disc shaped bottom portion 11a. The inner side end of the inner member 1 is closed. That is, the pilot portion for fitting engagement with the knuckle 11 is not formed on the outer circumference of the outer member 10. Thus, the body mounting flange 10b of the outer member 10 abuts against the knuckle 11. They are fastened to each other by bolts (not shown). This reduces the size and weight of the wheel bearing apparatus and increases the rigidity and strength of the knuckle 11. In addition, it is possible to prevent the entry of foreign matter such as rain water or dusts into the detecting portion of the pulser ring 23 and keep its detecting accuracy for a long term.

As shown in FIG. 2, the body mounting flange 10b of the outer member 10 is formed with a plurality (four in this embodiment) of bolt bores 12. A plurality (two in this embodiment) of pin bores 13 are formed between the bolt bores 12. The knuckle 11 is formed with bolt bore 14 and female threaded bores 15 corresponding to the bolt bores 12 and pin bores 13, respectively, as shown in FIG. 1. A pin 16 includes a tip portion 17 inserted into the pin bore 13. A threaded portion 18 of the pin 16 is screwed into the threaded bore 15 of the knuckle 11. This firmly and easily secure the pins 16 to the knuckle 11. Thus, the outer member 10 can be secured on the knuckle 11 with the pins 16 inserted into the pin bores 13 of the outer member 10 and the outer member is radially positioned on the knuckle 11. This makes easy alignment of the axial centers of the outer member 10 and the knuckle 11. Additionally, the pins 16 position the outer member 10 and knuckle 11 relative to the bolt bores 12, 14. Thus, their assembly can be simplified. Alternatively, it may be possible to press-fit the pins 16' into the knuckle 11 via a predetermined interference using pin portion 18' instead of threaded portion 18 in order to simplify the structure of the pins 16' and the workability of assembly as illustrated in FIG. 3(c).

FIG. 3 illustrates modifications of the positioning pin. In one modification shown in FIG. 3(a), a pin 19 is formed with a stepped configuration. The pin 19 includes a tip portion 17 fit into the pin bore 13 of the body mounting flange 10b. A threaded portion 20, with a larger diameter than that of the tip portion 17, is adapted to be screwed into the threaded bore 15 of the knuckle 11. The pin 19 with the stepped configuration prevents the pin from slipping off of the knuckle by vibration caused during driving of the vehicle. Thus, this improves the reliability of the wheel bearing apparatus.

In another modification shown in FIG. 3(b), a pin 21 has a structure that includes a tip portion 17 adapted to be fit into the pin bore 13 of the body mounting flange 10b. A threaded portion 18 is adapted to be screwed into the threaded bore 15 of the knuckle 11. A flanged portion 22 is formed between the tip portion 17 and the threaded portion 18. The pin 21 with the flanged portion 22 prevents the pin 21 from slipping off of the knuckle 11. The pin 21 performs sure positioning of the pin 21 itself relative to the knuckle 11. The pin 21 improves the sealability between the outer member 10 and knuckle 11 with the body mounting flange 10b of the outer member 10 in close contact with the knuckle 11.

The wheel bearing apparatus of the present disclosure can be applied to wheel bearing apparatus of the inner ring rotation style of the second or third generation type used in a driven wheel side.

The present disclosure is described with reference to the preferred embodiment. Obviously, modifications and alternations will occur to those of ordinary skill in the art upon reading and understanding of the preceding detailed description. It is intended that the present disclosure be construed to include all such alternations and modifications insofar as they come within the scope of the appended claims or their equivalents.

What is claimed is:

1. A wheel bearing apparatus for a driven wheel of a vehicle comprising:

an outer member integrally formed with a body mounting flange on its outer circumference, said body mounting flange is adapted to be mounted on a knuckle that forms part of a suspension apparatus, and an inner circumference of said outer member includes double row outer raceway surfaces;

an inner member including a wheel hub and at least one inner ring, said wheel hub integrally formed at one end with a wheel mounting flange and on another end with a cylindrical portion, said at least one inner ring is press-fit onto the cylindrical portion of the wheel hub, said inner member formed with double row inner raceway surfaces on its outer circumference, said double row inner raceway surfaces arranged opposite to the double row outer raceway surfaces;

double row rolling elements are rollably contained, via cages, between the inner raceway surfaces of the inner member and the outer raceway surfaces of the outer member; and the knuckle has a disc shaped bottom portion, said outer member is secured to the knuckle by fastening bolts with the body mounting flange being abutted against the bottom portion of the knuckle, the inner side end of the inner member is closed by the knuckle, a plurality of pins is secured to the knuckle, and pin bores for receiving the pins are formed on the body mounting flange, said pins radially positioning the outer member relative to the knuckle.

2. The wheel bearing apparatus of claim 1, wherein the bottom portion of the knuckle is formed with threaded bores, and the pins each have a tip portion to be inserted into the respective pin bore and a threaded portion to be screwed into the threaded bore.

3. The wheel bearing apparatus of claim 2, wherein the tip portion of each pin is formed with a diameter smaller than a diameter of the threaded portion, and said pins are formed with a stepped configuration.

4. The wheel bearing apparatus of claim 2, wherein a flanged portion is integrally formed between the tip portion of each said pin and the respective threaded portion.

5. The wheel bearing apparatus of claim 1, wherein the bottom portion of the knuckle is formed with pin bores into which the pins are press-fit via a predetermined interference.

6. A wheel bearing apparatus of claim 1, wherein the inner member wheel hub is formed with one inner raceway surface on its outer circumference, said one inner raceway surface opposed to one of the double row outer raceway surfaces and said the cylindrical portion axially extending from the inner raceway surface, said inner ring press-fit onto the cylindrical portion of the wheel hub, via a predetermined interference, said inner ring outer circumference including the other inner raceway surface opposed to the other of the double row outer raceway surfaces, said inner ring is axially secured by a caulked portion, said caulked portion formed by plastically deforming the end of the cylindrical portion radially outward, said caulked portion applying a predetermined bearing pre-pressure into the inner ring.

* * * * *